(12) United States Patent
Hoshi

(10) Patent No.: US 8,783,780 B2
(45) Date of Patent: Jul. 22, 2014

(54) VEHICLE SEAT

(75) Inventor: Masayuki Hoshi, Tochigi (JP)

(73) Assignee: TS Tech Co., Ltd., Saitama (JP)

( * ) Notice: Subject to any disclaimer, the term of this patent is extended or adjusted under 35 U.S.C. 154(b) by 397 days.

(21) Appl. No.: 13/069,805

(22) Filed: Mar. 23, 2011

(65) Prior Publication Data

US 2011/0233980 A1   Sep. 29, 2011

(30) Foreign Application Priority Data

Mar. 26, 2010 (JP) ................. 2010-071945

(51) Int. Cl.
*A47C 7/02* (2006.01)

(52) U.S. Cl.
USPC ............ 297/452.18; 297/452.65; 297/452.36; 297/452.52

(58) Field of Classification Search
USPC ............. 297/452.18, 452.48, 452.49, 452.55, 297/452.12, 452.14, 452.31, 452.65
See application file for complete search history.

(56) References Cited

U.S. PATENT DOCUMENTS

| | | | | |
|---|---|---|---|---|
| 4,830,433 | A | * | 5/1989 | Takahashi ............... 297/354.12 |
| 5,518,297 | A | * | 5/1996 | Kassai ..................... 297/452.55 |
| 5,895,096 | A | * | 4/1999 | Massara ................... 297/452.34 |
| 5,951,110 | A | * | 9/1999 | Conner et al. ........... 297/452.31 |
| 6,234,578 | B1 | * | 5/2001 | Barton et al. ............ 297/452.41 |
| 6,568,761 | B2 | * | 5/2003 | Perske et al. ............ 297/452.6 |
| 7,677,669 | B2 | * | 3/2010 | Blankart ................. 297/452.18 |
| 2004/0183356 | A1 | * | 9/2004 | Philippot et al. ........ 297/452.18 |
| 2006/0273649 | A1 | * | 12/2006 | Saberan .................. 297/452.18 |
| 2008/0150343 | A1 | * | 6/2008 | Minakawa et al. ....... 297/452.18 |
| 2008/0277993 | A1 | | 11/2008 | Blankart |
| 2009/0315373 | A1 | * | 12/2009 | Thomas et al. ......... 297/216.13 |
| 2010/0019560 | A1 | * | 1/2010 | Ito .......................... 297/452.48 |
| 2011/0089742 | A1 | * | 4/2011 | Takahashi et al. ...... 297/452.48 |
| 2011/0298268 | A1 | * | 12/2011 | Mizobata ................ 297/452.18 |
| 2012/0306253 | A1 | * | 12/2012 | Seibold et al. ........... 297/354.1 |

FOREIGN PATENT DOCUMENTS

| | | |
|---|---|---|
| JP | 61-136947 U | 8/1986 |
| JP | 2005-261569 A | 9/2005 |
| JP | 2008-514490 A | 5/2008 |

OTHER PUBLICATIONS

Office Action issued for JP 2010-071945 (Apr. 8, 2014).

\* cited by examiner

*Primary Examiner* — David R Dunn
*Assistant Examiner* — Alexander Harrison
(74) *Attorney, Agent, or Firm* — Drinker Biddle & Reath LLP

(57) ABSTRACT

A vehicle seat is formed by mounting cushion materials on a seat frame having a seat back frame and a seat cushion frame and covering the cushion materials with skin materials. At least one of the seat back frame and the seat cushion frame is provided with a first frame receiving a load of a passenger, and a second frame spaced from the first frame to face the first frame, and peripheral portions of the first frame and peripheral portions of the second frame are at least partially overlapped with each other to form overlapping portions, and fixed and jointed at a position away from the side where the load of the passenger is received.

11 Claims, 11 Drawing Sheets

B-B sectional view

A-A sectional view

B-B sectional view

B-B sectional view

VEHICLE SEAT

CROSS-REFERENCE TO RELATED PATENT APPLICATION

This application claims the benefit of Japanese Patent Application No. 2010-071945, filed on Mar. 26, 2010, in the Japanese Patent Office, the disclosure of which is incorporated herein in its entirety by reference.

BACKGROUND

The present invention relates to a vehicle seat, particularly to a vehicle seat for suppressing damage of an interior material provided on a seat frame to maintain a favorable seat shape.

When a vehicle such as a motor vehicle is impacted from the front side, the rear side, and the side, due to inertia force, a passenger is moved in the colliding direction of forward, rearward, and sideward, respectively, relative to the vehicle. Since a great shock is given to the passenger at this time, there is a need for ensuring safety of the passenger.

When the vehicle is impacted from the front side, the rear side, and the side, a technique of absorbing a load at the time of impact, that is, impact energy by a buffer structure (such as an engine compartment and a console box) provided on the vehicle body side to ensure the safety of the passenger is used. In order to transmit such impact energy to the vehicle body side to be absorbed, there is a need for improving rigidity of a vehicle seat on which the passenger is seated to efficiently transmit the impact energy to the vehicle body side.

When the vehicle is impacted from the rear side, and when baggage or the like is placed on the rear side of the passenger, the baggage is rapidly moved forward due to the inertia force. Thus, there is a need for protecting the passenger from a colliding object such as the baggage. Further, when the vehicle is impacted from the rear side, the passenger's body is moved rearward. Thus, there is a need for reliably holding the passenger's body by the vehicle seat. Therefore, in order to protect the passenger from the colliding object, there is also a need for improving the rigidity of the vehicle seat.

In the vehicle seat, there is a need for providing the rigidity in order to hold a seating space of the passenger, and to ensure the safety of the passenger without deformation not only due to the shock in the front and rear direction but also shock energy when the vehicle is impacted on a side surface.

Japanese Patent Application Publication No. 2008-514490 ("the '490 Publication") relates to a seat back structure for a vehicle seat and discloses a vehicle seat in which plate-shaped front and rear shells formed into a seat back shape are arranged to face each other and adhered to each other.

With such a configuration, the rigidity against the shock in the front and rear direction as well as the left and right direction (the seat width direction) can be improved in the seat back of the vehicle seat.

The '490 Publication discloses a configuration that the plate-shaped front and rear shells respectively arranged in the front and rear direction are adhered to each other in a seat back frame.

However, in the technique of this publication, an inner surface portion of the front shell is formed to be smaller than an inner surface portion of the rear shell, and the front and rear shells are overlapped with and jointed to each other on a surface on the side where the passenger is seated.

Therefore, with the vehicle seat disclosed in the '490 Publication, when the passenger is seated, a load of the passenger is applied onto a part where the front and rear shells are overlapped with and jointed to each other (hereinafter, called the "overlapping portion"). The overlapping portion has a level difference due to plate thickness of the front and rear shells. Thus, when the passenger moves on the seat, interior materials such as a cushion material and a skin material arranged between the seat back frame and the passenger are rubbed with the overlapping portion and then worn away. As a result, there is a problem that the interior materials are damaged, and hence strength is lowered.

Also, there is the level difference in the overlapping portion of the front and rear shells on the side where the passenger is seated. Thus, when the cushion material is disposed thereon, the cushion material is deformed, so that there is a disadvantage that an outer appearance of the vehicle seat is deteriorated.

An object various embodiments of the present invention is to provide a vehicle seat for suppressing damage of the interior materials such as the cushion material and the skin material to favorably maintain a seat shape.

SUMMARY

According to an embodiment, the above problem is solved by A vehicle seat, comprising: a seat frame, comprising a seat back frame and a seat cushion frame; cushion material mounted on the seat frame; skin material covering the cushion material; a first frame of at least one of the seat back frame and the seat cushion frame, that receives a load of a passenger; and a second frame spaced from the first frame to face the first frame;

wherein: a peripheral portion of the first frame and a peripheral portion of the second frame are at least partially overlapped with each other to form an overlapping portion, and fixed and jointed at a position away from a side where the load of the passenger is received.

In such a way, with the vehicle seat, the overlapping portion in which the first frame and the second frame are jointed to each other is arranged at a point other than a position where the load of the passenger is received in the seat back frame or the seat cushion frame. With this configuration, the load of the passenger is not easily imposed onto the overlapping portion via an interior material such as the cushion material. As a result, the interior material can be prevented from being strongly pushed onto a level difference (a projection portion) formed in the overlapping portion, so that the interior material is not damaged due to friction. Since the overlapping portion is provided at the point other than the position where the load of the passenger is received, the seat can be designed without distortion of a seat shape at least on the side where the passenger is seated.

In this case, favorably, as in an embodiment, the seat back frame is provided with a front frame serving as the first frame, and a rear frame serving as the second frame, the front frame has a front portion supporting a passenger's body, and a front frame peripheral portion extending in a rear frame direction from a periphery of the front portion, the rear frame has a rear portion arranged at a position to face the front portion, and a rear frame peripheral portion extending in a front frame direction from a periphery of the rear portion, the front portion and the rear portion are spaced from each other to face each other, and the front frame peripheral portion and the rear frame peripheral portion are partially overlapped with each other, fixed, and jointed on the side surface sides of the front portion and the rear portion.

In such a way, when substantially rectangular plate materials are jointed in the front and rear direction of the seat back frame, the vehicle seat having a high rigidity against shock in the front and rear direction as well as the left and right direction can be provided with a simple configuration.

Conventionally, a seat back frame is formed by side frames forming seat width, and an upper frame, a lower frame, and the like, bridged onto these side frames. Thus, there is a disadvantages of a large number of parts and complicated assembling. The seat back frame of various embodiments is formed by jointing the front frame peripheral portion and the rear frame peripheral portion. Thus, the vehicle seat can have a simple configuration and a light weight.

With such a configuration, since there is no need for separately providing a reinforcing member against a large load in the fixed direction, the number of parts is small. Therefore, due to a small number of joint surfaces on which parts are jointed, the vehicle seat having more durability can be provided.

Further, with such a vehicle seat, since the front frame and the rear frame have plate shapes, a particularly high strength against a load from the side is obtained.

With the conventional seat back frame, there are spaces between frames provided on the upper side, the lower side, and the side. Thus, there is a fear that when impact is caused in the front and rear direction as well as the left and right direction, the frames are deformed and a seating space of the passenger is damaged. However, with the present vehicle seat, the front frame and the rear frame are respectively formed into one plate continuous in the left and right direction. Thus, the vehicle seat has enough rigidity against the load especially from the side. Since four sides of the front frame and the rear frame are closed to form a casing in such a way, a structure is stable, so that the vehicle seat having a high strength against the loads in all the directions can be obtained.

In this case, favorably, as in an embodiment, a recess portion or an opening portion is formed at a position corresponding to a back of the passenger in the front portion, and a coupling surface extending in the seat width direction is formed in a center part of at least one of the front portion and the rear portion.

In such a way, when the recess portion or the opening portion is formed at the position corresponding to the back of the passenger, it accommodates depression of the back of the passenger. Impact energy, especially from the side, can be received by a ridgeline part of the recess portion or the opening portion, that is, the coupling surface.

When part of the front portion is cut out to provide the opening portion, a part of the plate material corresponding to the opening portion is cut off, so that the vehicle seat can be light weight.

In this case, preferably, as in an embodiment, a reclining device attachment portion is integrally formed on the lower side of a side part of at least one of the front frame peripheral portion and the rear frame peripheral portion.

In such a way, when a reclining device is integrally formed, the number of parts relating to attachment of the reclining device can be reduced, so that workability at the time of assembling is improved.

Further, preferably, as in an embodiment, the seat frame has a device attachment portion for attaching a device that is attached to the seat frame, projection portions formed to expand toward the passenger are formed on both of the left and right sides of the front portion, and the projection portions are provided with cutout portions at positions facing the device attachment portion.

In such a way, when the expanding projection portions are provided in the front portion and the cutout portions are provided in the projection portions, members such as an actuator, a reclining shaft, an airbag device, and a harness can easily be installed inside or outside the seat back frame via the cutout portions.

Further in this case, preferably, as in an embodiment, a coupling element is jointed on one of the left and right sides of the front frame, and the coupling element is coupled to a side airbag unit.

With such a configuration, the side airbag unit can be arranged on the side of the seat back frame. As a result, the vehicle seat having a higher safety at the time of side surface impact can be obtained.

Favorably, as in an embodiment, in the vehicle seat further including a headrest arranged on the upper side of the seat back frame, at least at one of the front frame peripheral portion and the rear frame peripheral portion, a part corresponding to a position where a headrest pillar supporting the headrest is arranged is cut out, so that a pillar support hole supporting the headrest pillar is formed.

In such a way, when both of the front frame peripheral portion and the rear frame peripheral portion, or one of the front frame peripheral portion and the rear frame peripheral portion is partially cut out, the headrest pillar can be supported without separately arranging a member for supporting the headrest pillar. Therefore, since there is no need for forming a pillar support portion as a separate body, the seat back frame with a simple configuration can be provided. Since there is no need for jointing the member supporting the headrest pillar, the vehicle seat can have a lighter weight.

With one or more of the designs described above, the following advantages may be realized.

The interior material can be prevented from being damaged by the friction between the interior material such as the cushion material and the seat frame. The seat can be designed without distorting the seat shape.

A seat back frame with a simple configuration and a light weight can be provided. Since the four sides of the seat back frame are closed, the strength is improved due to the structure, so that the vehicle seat having a large deformation resistance and a high rigidity against the loads at the time of the impact in all the directions can be obtained.

Since the recess portion or the opening portion may be provided at the position corresponding to the back of the passenger, it accommodates the depression of the back of the passenger. Thus, the vehicle seat having a better seating feel can be obtained.

The number of parts can be reduced, so that the workability at the time of assembling is improved.

A task of attaching auxiliary devices can easily be performed via the cutout portions formed in the front frame. As a result, the vehicle seat having a high productivity can be provided.

A side airbag unit can be provided. Thus, the vehicle seat having a high safety even at the time of the side surface impact can be obtained.

Since there is no need for separately providing a support member for supporting the headrest pillar, the vehicle seat with a light weight is obtained.

As described above, with the vehicle seat various embodiments of the present invention, by fixing and jointing the first frame and the second frame at the position other than the side where the passenger is seated, the interior material such as the cushion material can be prevented from being worn away by a joint part thereof. Since the seat back frame and the seat cushion frame have flat sectional structures, the vehicle seat has a high strength and rigidity against the loads in the front and rear direction as well as the left and right direction due to the structures.

BRIEF DESCRIPTION OF THE DRAWINGS

The following drawings illustrate various embodiments of the invention.

DETAILED DESCRIPTION

Hereinafter, embodiments of the present invention will be described with reference to the drawings. Members, arrangement, and the like described below do not limit the present invention but, as a matter of course, can be variously modified along the gist of the present invention. In the present specification, the term "vehicle" indicates a traveling vehicle to which a seat can be equipped including a ground running wheeled vehicle such as a motor vehicle and a train, and an airplane and a vessel moving in an area other than the ground. A "load at the time of impact" is a heavy load generated due to impact in all the directions including the front and rear direction as well as the left and right direction, indicating a large impact in all the directions due to a vehicle, but does not include a load area similar to a load generated at the time of normal seating and boarding of a passenger.

Figure 1:
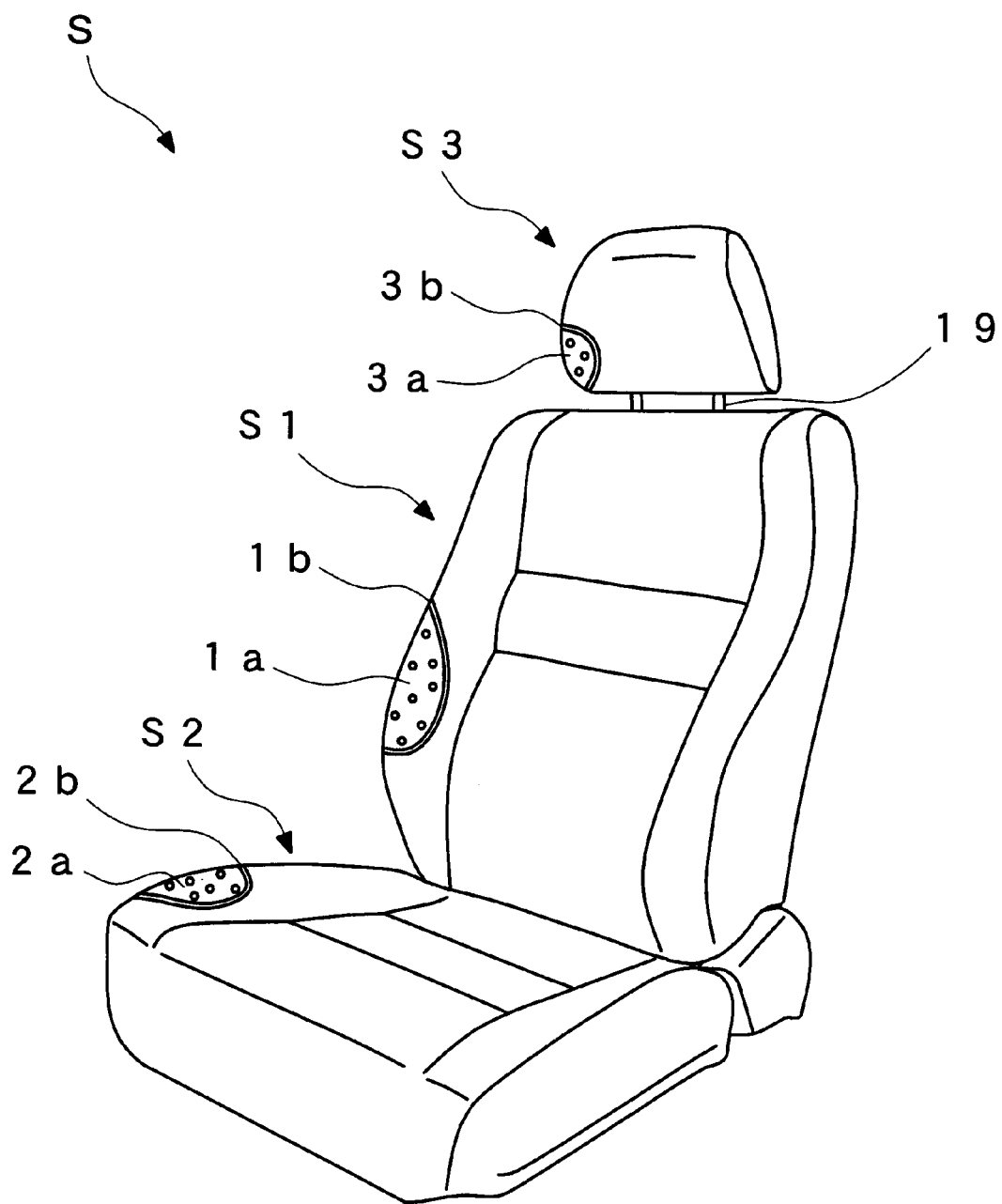
FIG. 1 is a schematic perspective view of a seat according to an embodiment of the present invention.
Figure 8A:
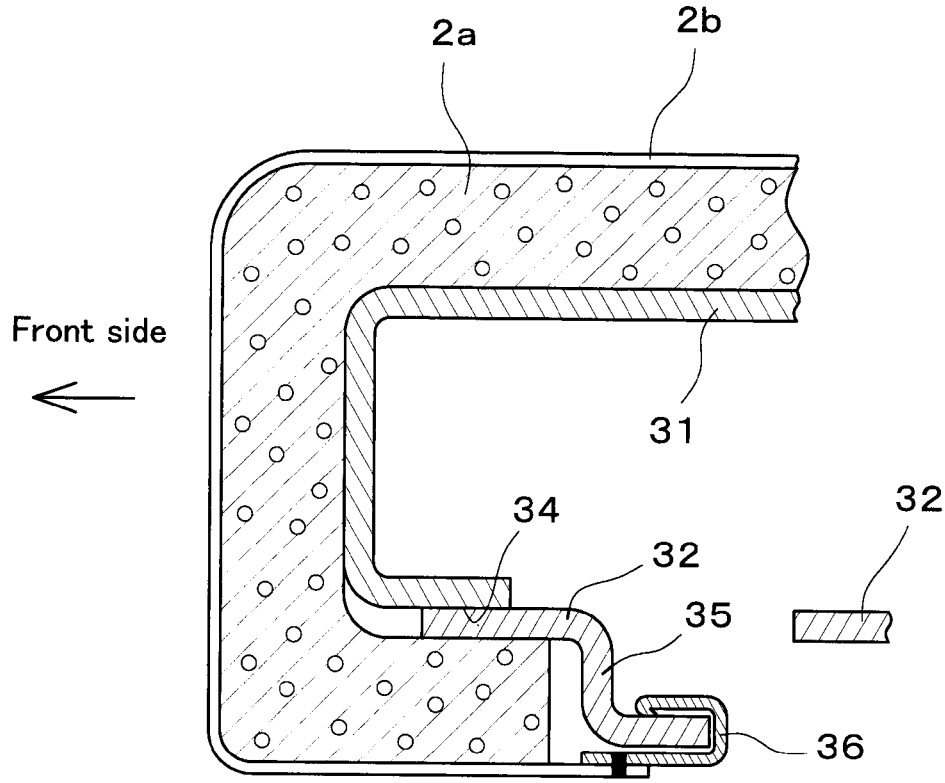
FIG. 8A is a sectional view of an example of a seat cushion frame according to the first embodiment of the present invention in a front-to-rear direction.
Figure 8B:
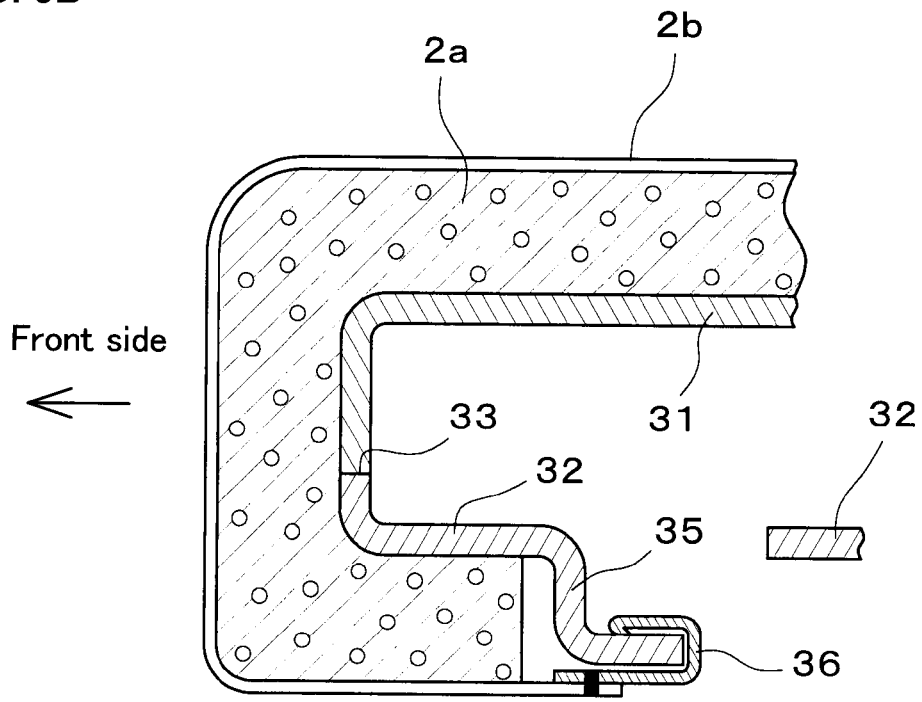
FIG. 8B is a sectional view of another example of a seat cushion frame according to the first embodiment of the present invention in a front-to-rear direction.
Figure 9:
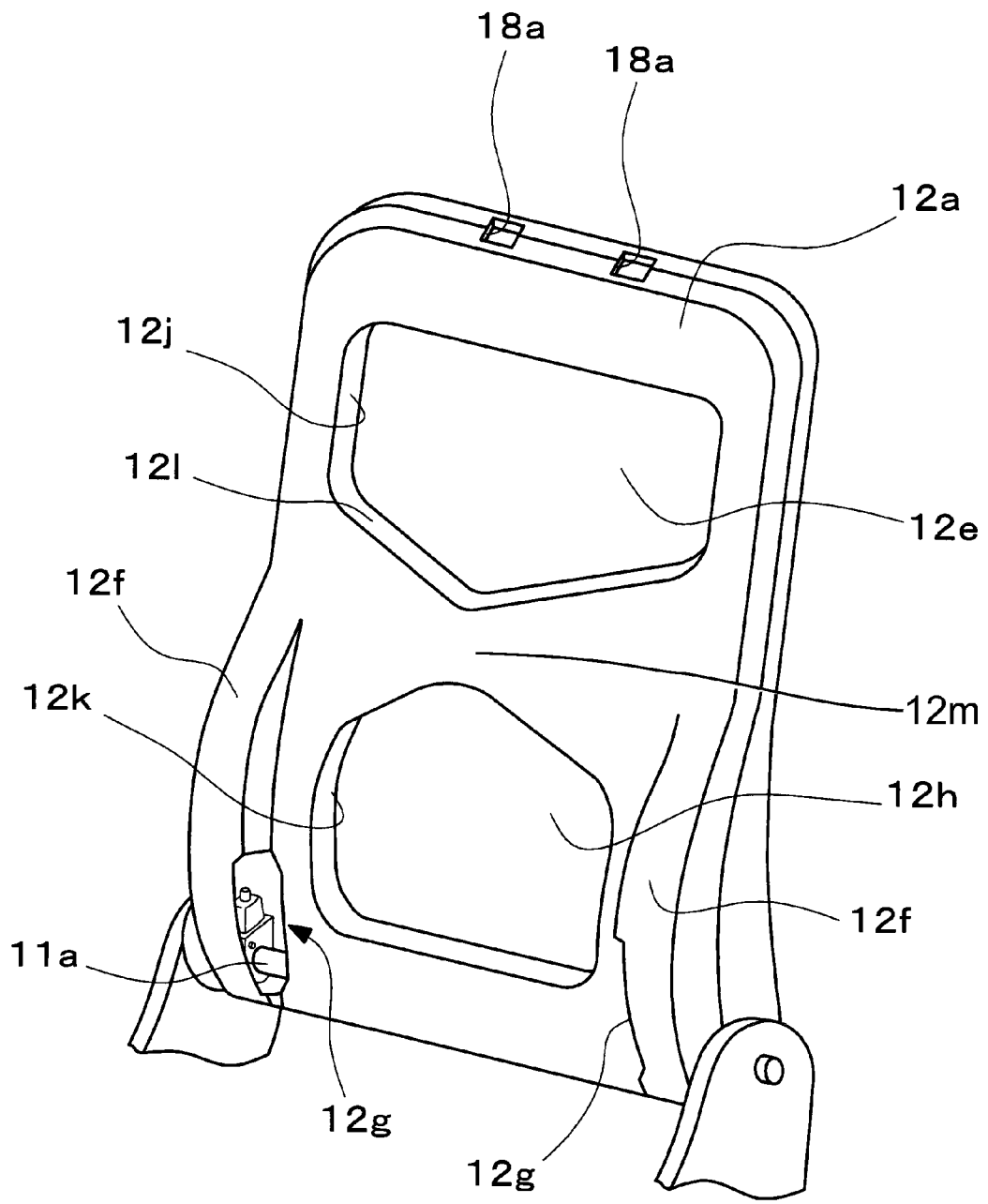
FIG. 9 is a schematic perspective view of a seat back frame according to a second embodiment of the present invention.
Figure 10:
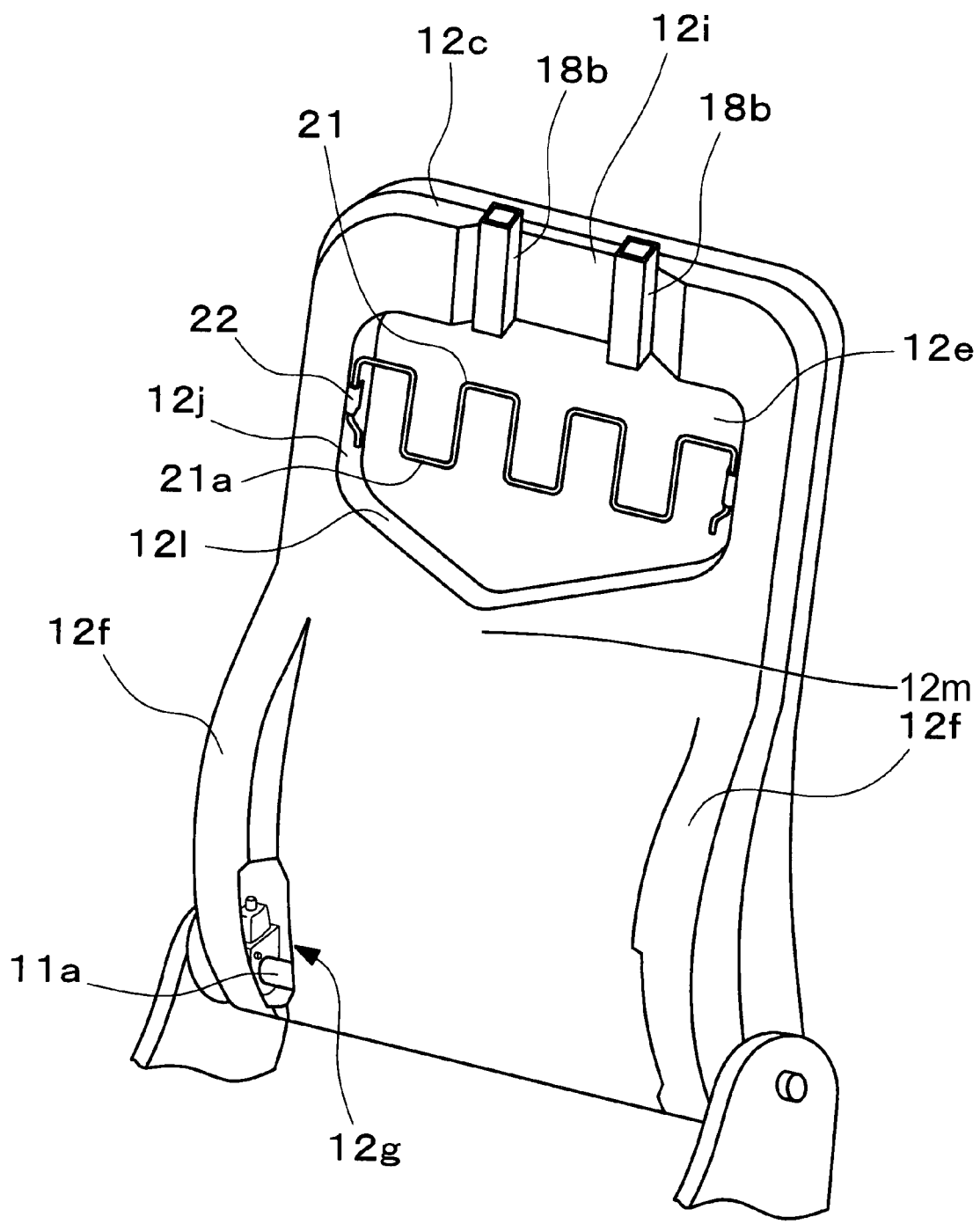
FIG. 10 is a schematic perspective view of a seat back frame according to a third embodiment of the present invention.
Figure 11:
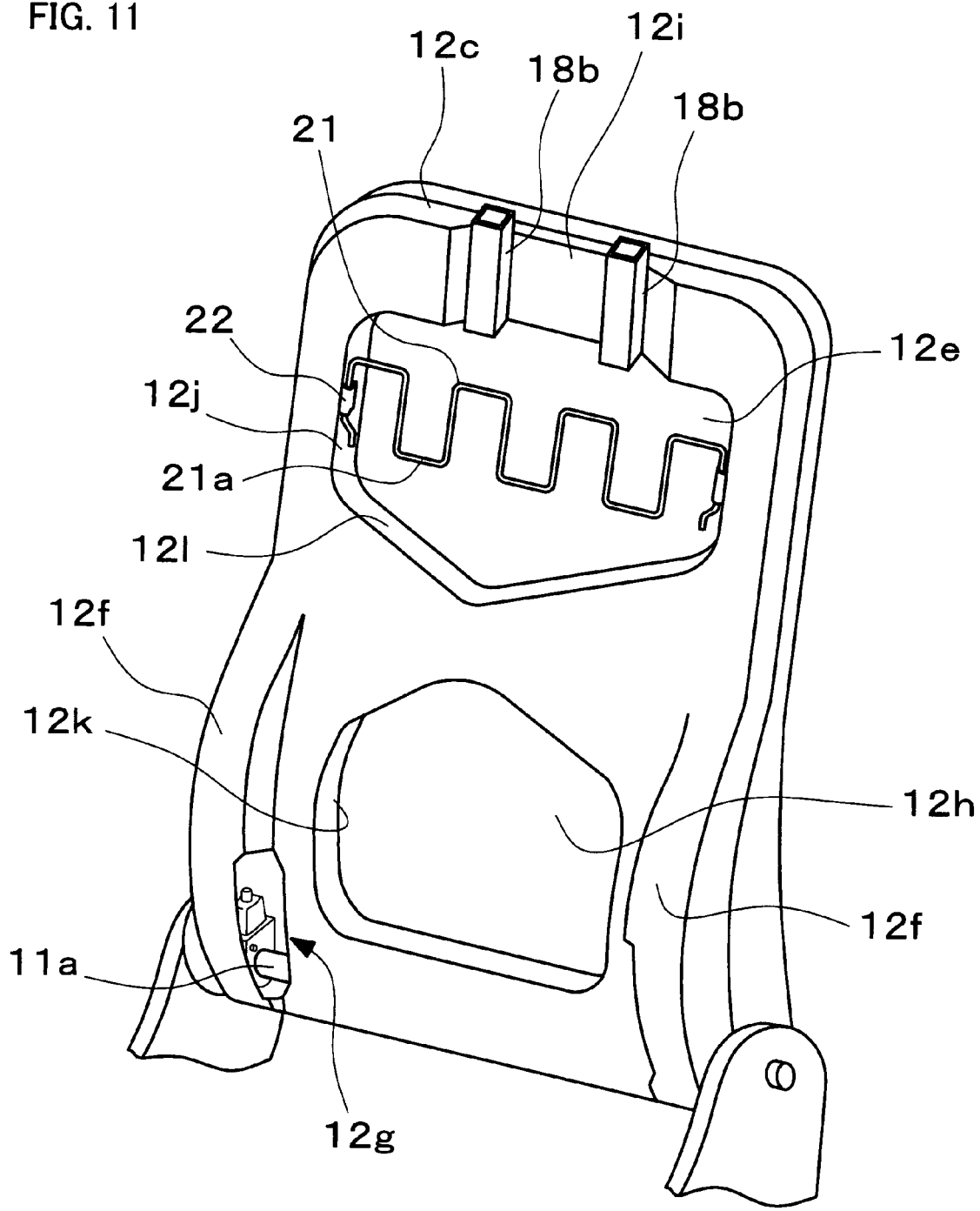
FIG. 11 is a schematic perspective view of a seat back frame according to a fourth embodiment of the present invention.

FIGS. 1 to 11 show embodiments according to the present invention. FIG. 1 is a schematic perspective view of a seat, and FIGS. 2 to 8 are of a first embodiment of the present invention. FIG. 9 is a schematic perspective view of a seat back frame according to a second embodiment of the present invention, FIG. 10 is a schematic perspective view of a seat back frame according to a third embodiment of the present invention, and FIG. 11 is a schematic perspective view of a seat back frame according to a fourth embodiment of the present invention.

First Embodiment

A vehicle seat S according to the first embodiment is formed by a seat back S1 (a back portion), a seating portion S2, and a headrest S3 as shown in FIG. 1. The seat back S1 (the back portion) and the seating portion S2 are formed by mounting cushion pads 1a, 2a on a seat frame F and covering the cushion pads with skin materials 1b, 2b. Therefore, the cushion pad 1a is mounted on a front frame 12 described below and covered with the skin material 1b. The headrest S3 may be formed by arranging a cushion pad 3a onto a core (not shown) of a head part and covering the cushion pad with a skin material 3b. The reference numeral 19 denotes a headrest pillar supporting the headrest S3.

Figure 2:
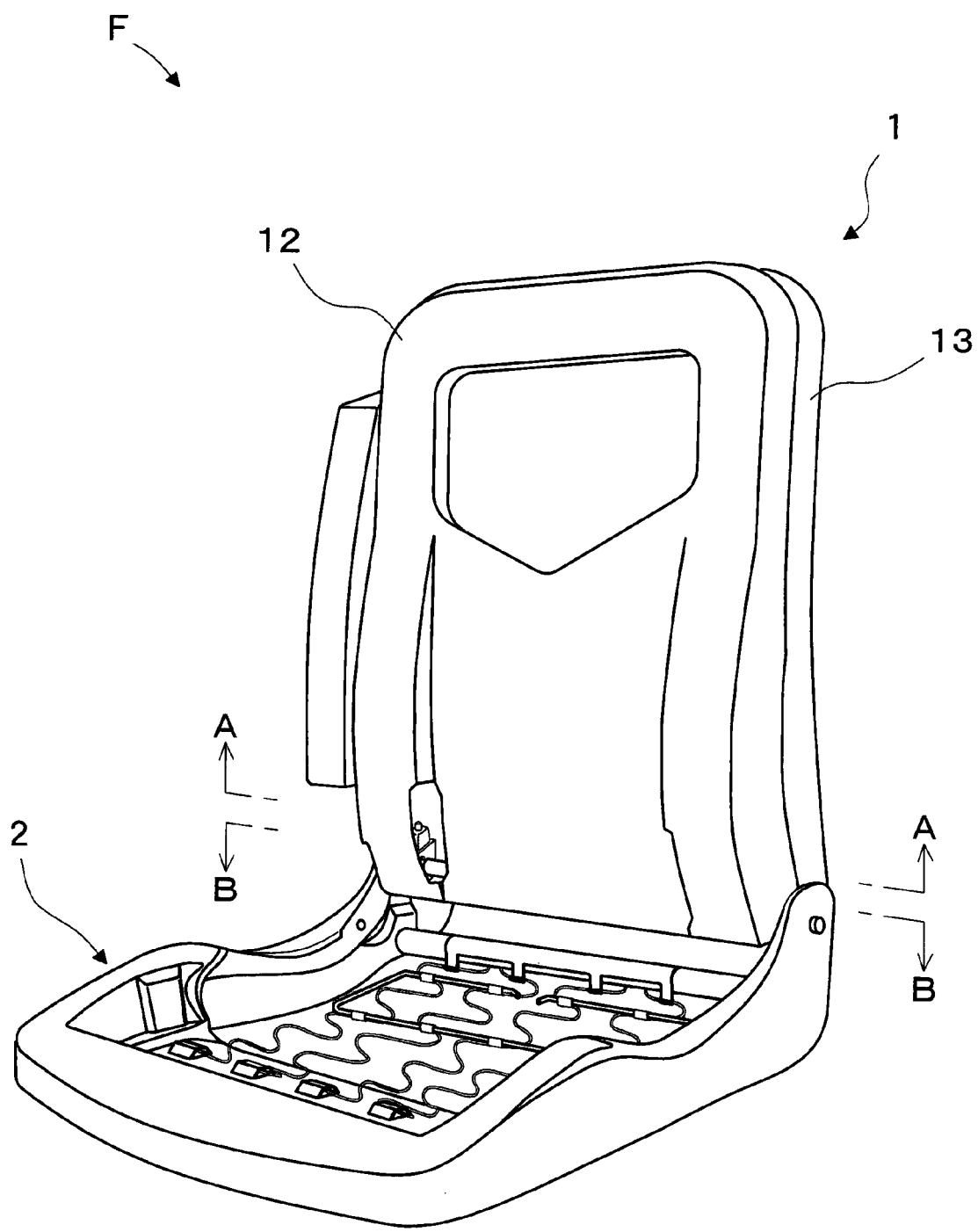
FIG. 2 is a schematic perspective view of a seat frame according to the first embodiment of the present invention.

As shown in FIG. 2, the seat frame F of the vehicle seat S is formed by a seat back frame 1 forming the seat back S1, and a seat cushion frame 2 forming the seating portion S2.

The cushion pad 2a is mounted on the seat cushion frame 2 as described above and the cushion pad 2a is covered with the skin material 2b, so that the passenger is supported from the lower side. The seat cushion frame 2 is supported by leg portions, and inner rails (not shown) are attached to the leg portions and assembled to be a sliding type in which a position is adjustable in the front and rear direction with outer rails installed in a vehicle body floor. A rear end of the seat cushion frame 2 is coupled to the seat back frame 1 via a reclining mechanism 11.

The seat back S1 is formed by mounting the cushion pad 1a on the seat back frame 1 as described above and covering the cushion pad 1a with the skin material 1b, to support the back of the passenger from the rear side. In the present embodiment, as shown in FIG. 2, the seat back frame 1 is formed by fixing and jointing the front frame 12 and a rear frame 13 formed into substantially rectangular plates, the front frame serving as a first frame and the rear frame serving as a second frame, at front frame 12 peripheral portions and rear frame 13 peripheral portions (on the sides, the upper side, and the lower side). At this time, in the case where joint strength is sufficient, it is not necessary to fix and joint all the side surfaces (parts positioned on the sides, the upper side, and the lower side of the peripheral portions).

Therefore, only the sides of the front frame 12 and the sides of the rear frame 13 (front side portions 12b and rear side portions 13b) may be fixed and jointed. When the seat back frame 1 is fixed and jointed on all of the upper side, the lower side, and the sides, a manufacturing process is extended and cost is increased. However, when the seat back is fixed and jointed only on the sides, the manufacturing process can be shortened.

Since the front frame 12 and the rear frame 13 require sufficient rigidity, the frames are made of metal such as SUS. Plate thickness in this case is appropriately designed depending on the material.

Figure 3:
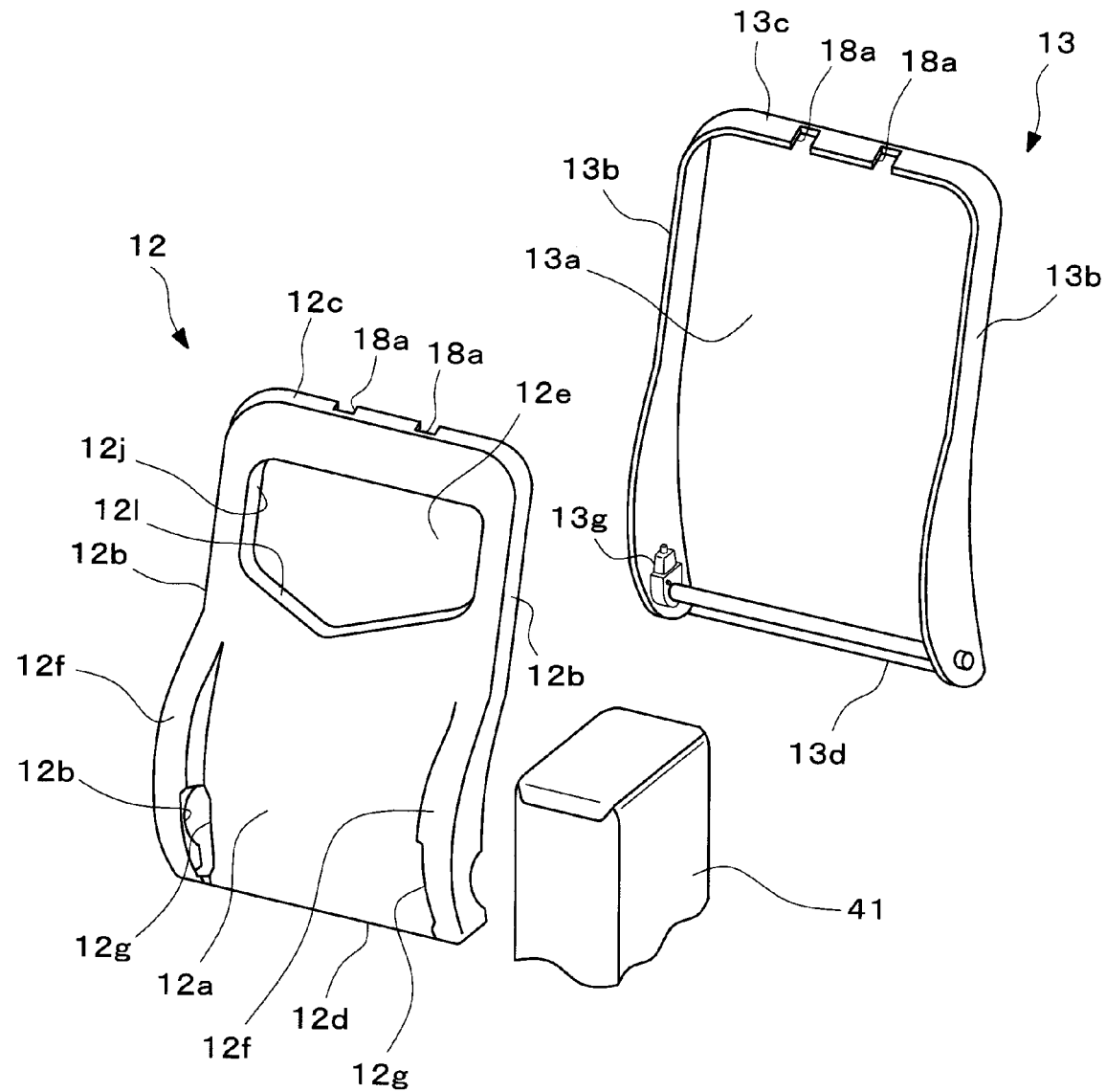
FIG. 3 is an exploded perspective view of a seat back frame according to the first embodiment of the present invention.

As shown in FIG. 3, the seat back frame 1 has the front frame 12 provided with a front portion 12a, the front side portions 12b (the front frame 12 peripheral portions), a front upper portion 12c (the front frame 12 peripheral portion), and a front lower portion 12d (the front frame 12 peripheral portion), and the rear frame 13 provided with a rear portion 13a, the rear side portions 13b (the rear frame 13 peripheral portions), a rear upper portion 13c (the rear frame 13 peripheral portion), and a rear lower portion 13d (the rear frame 13 peripheral portion). The front side portions 12b and the rear side portions 13b, the front upper portion 12c and the rear upper portion 13c, and the front lower portion 12d and the rear lower portion 13d are arranged to be partially overlapped with each other, and fixed and jointed in this overlapping parts (refer to FIG. 5).

The front frame 12 is provided with the front side portions 12b, the front upper portion 12c, and the front lower portion 12d formed to extend rearward of the seat frame F (that is, toward the side where the rear frame 13 is arranged) in a periphery of the front portion 12a formed into a substantially rectangular plate. The rear frame 13 is provided with the rear side portions 13b, the rear upper portion 13c, and the rear lower portion 13d formed to extend forward of the seat frame F (that is, toward the side where the front frame 12 is arranged) in a periphery of the rear portion 13a.

Therefore, the front frame 12 and the rear frame 13 are fixed and jointed by respectively partially overlapping the front frame 12 peripheral portions and the rear frame 13 peripheral portions formed as described above on the side surface sides of the front portion 12a and the rear portion 13a. Thus, the seat back frame 1 becomes a hollow casing. In more detail, the frames are fixed and jointed so that the front side portions 12b, the front upper portion 12c, and the front lower portion 12d are respectively partially overlapped with the rear side portions 13b, the rear upper portion 13c, and the rear lower portion 13d.

In order to support the cushion pad 1a from the back side of the passenger and easily receive a depression of the passenger, the front frame 12 is provided with a first recess portion 12e in a part corresponding to a back position of the passenger. The first recess portion 12e is provided with a first recess portion side wall 12j in a periphery thereof, and formed continuously and integrally with the front portion 12a. Preferably, such a front frame 12 is formed by press-molding.

A coupling surface 12l provided concavely in the left and right direction in the first recess portion side wall 12j is formed into a substantially V shape when seen from the front side. It is preferable that the coupling surface 12l is formed along the direction in which a load is transmitted at the time of imposing the load from the side, since the load can be more efficiently transmitted to the vehicle body center, and the rigidity against the load is improved. In the case where a console box 41 is provided on the side of the seat frame F, and when the console box 41 is arranged on an extension line of the coupling surface 12l (refer to FIG. 3), the load from the side can efficiently be transmitted to the console box 41.

In such a way, by appropriately adjusting a position at which the coupling surface 12l is formed, and the extending direction of the coupling surface 12l in the first recess portion 12e, the load can efficiently be transmitted to a vehicle body and the console box 41 in the case where the load is imposed.

When the first recess portion 12e is provided only at the position corresponding to the back of the passenger in the front frame 12 in such a way, the depression of a lumbar part of the passenger is suppressed on the lower side of the front frame 12. With such a configuration, safety of the passenger can be ensured even at the time of rear surface impact. That is, when the passenger is moved rearward at the time of the rear surface impact, the depression of the lumbar part of the passenger is suppressed. Thus, movement that a head part is inclined rearward integrally with an upper passenger's body is induced, suppressing that only the head part is so moved radically rearward that a cervical part is affected.

Projection portions 12f smoothly formed in the vicinity of the front side portions 12b are provided on the lower side of the front portion 12a in the front frame 12. The projection portions 12f are arranged on both of the left and right sides of the front portion 12a, and formed to expand forward (that is, on the back side of the passenger or the opposite side of the rear frame 13). Spaces having appropriate size are formed between the projection portions 12f and the rear portion 13a, and auxiliary devices (such as an actuator (a power motor) 11b for the reclining device, an airbag device, and a harness) can be arranged inside the spaces.

In order to simply install the actuator 11b and a reclining shaft 11a for the reclining device between the projection portions 12f and the rear frame 13, that is, inside the seat back frame 1, cutout portions 12g are provided in the projection portions 12f (refer to FIG. 7).

In such a way, the cutout portions 12g are provided on side surfaces of the projection portions 12f, that is, in points between surfaces arranged to face the back of the passenger and the projection portions 12f. As a result, favorably, the load of the passenger imposed on the cutout portions 12g is prevented.

After the front frame 12 and the rear frame 13 are fixed and jointed, the actuator 11b is inserted into the seat back frame 1 from the cutout portion 12g, and fixed by bolt fastening (not shown) through a bolt insertion hole provided on the side of the rear side portion 13b. That is, a reclining device attachment portion 13g is integrally formed in the rear side portion 13b. The cutout portion 12g is provided at a position facing the reclining device attachment portion 13g serving as a device attachment portion. Therefore, a position of the cutout portion 12g depends on installation positions of the actuator 11b and the reclining shaft 11a, and the cutout portion is provided specifically on the lower side of the projection portion 12f and on the center side of the seat back frame 1 (the side where the passenger is seated). Other auxiliary devices (such as a motor) to be attached to the seat frame F can be attached to the reclining device attachment portion 13g.

Even in the case where the auxiliary devices are attached on the outer side of the seat back frame 1, a tool can be inserted from the cutout portion 12g, so that an attachment task can be performed also from the inner side. Thus, assembling workability of the auxiliary devices is improved. Although the actuator 11b is attached inside the seat back frame 1 in the present embodiment, the reclining mechanism 11 does not necessarily be provided with the actuator 11b.

The rear frame 13 is formed so that the rear portion 13a, the rear side portions 13b, and the rear upper portion 13c respectively extend forward (that is, toward the side where the front frame 12 is arranged) to match a shape of the front frame 12. Although FIG. 3 shows the rear portion 13a provided with no recess portions and formed into a flat surface, the rear portion 13a may be provided with recess portions to match a shape of the first recess portion 12e of the front frame 12.

The headrest S3 is arranged on the upper side of the seat back frame 1. As described above, the headrest S3 is formed by providing the cushion pad 3a in an outer peripheral part of the core (not shown) and covering an outer periphery of the cushion pad 3a with the skin material 3b. Pillar support holes 18a are formed on the upper side of the seat back frame 1. The headrest pillar 19 (refer to FIG. 1) supporting the headrest S3 is attached to the pillar support holes 18a via guide locks (not shown), so that the headrest S3 is attached.

In the seat back frame 1, the pillar support holes 18a are formed between the front frame 12 and the rear frame 13. At this time, as in FIG. 4A, the front upper portion 12c of the front frame 12 and the rear upper portion 13c of the rear frame 13 (parts corresponding to the pillar support holes 18a) are partially cut out, and the front frame 12 and the rear frame 13 are fixed and jointed, so that cutout portions become holes having appropriate size to form the pillar support holes 18a.

In such a way, it is preferable that the cutouts are formed in the front upper portion 12c and the rear upper portion 13c, and double structures are formed in the pillar support holes 18a, since rigidity of the pillar support holes 18a is improved.

Figure 4A:
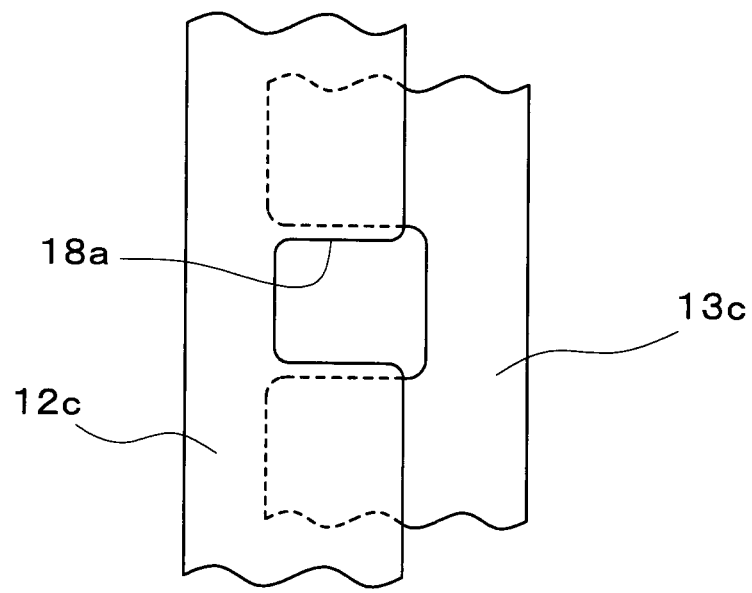
FIGS. 4A and 4B are illustrative views of a pillar support hole according to the first embodiment of the present invention.
Figure 4B:
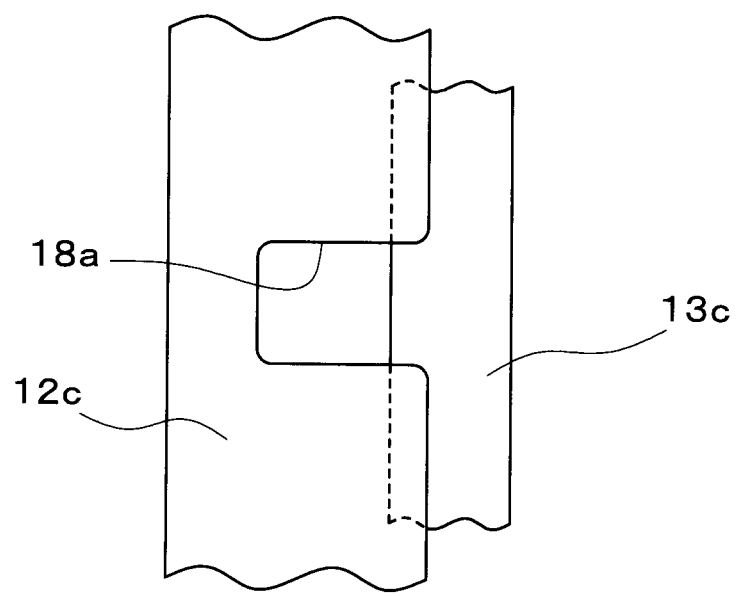

As in FIG. 4B, the cutouts may be provided only in the front upper portion 12c of the front frame 12 to form the pillar support holes 18a. In this case, no cutouts are formed in the rear upper portion 13c of the rear frame 13, and an end of the rear upper portion 13c is formed into a straight line. Thus, the headrest pillar 19 can stably be supported. Since there is no need for forming the cutouts in the rear upper portion 13c, a good assembling workability is obtained.

Although FIG. 4B shows an example that the cutouts are formed only in the front upper portion 12c, the cutouts may be provided only in the rear upper portion 13c as a matter of course.

Figure 5:
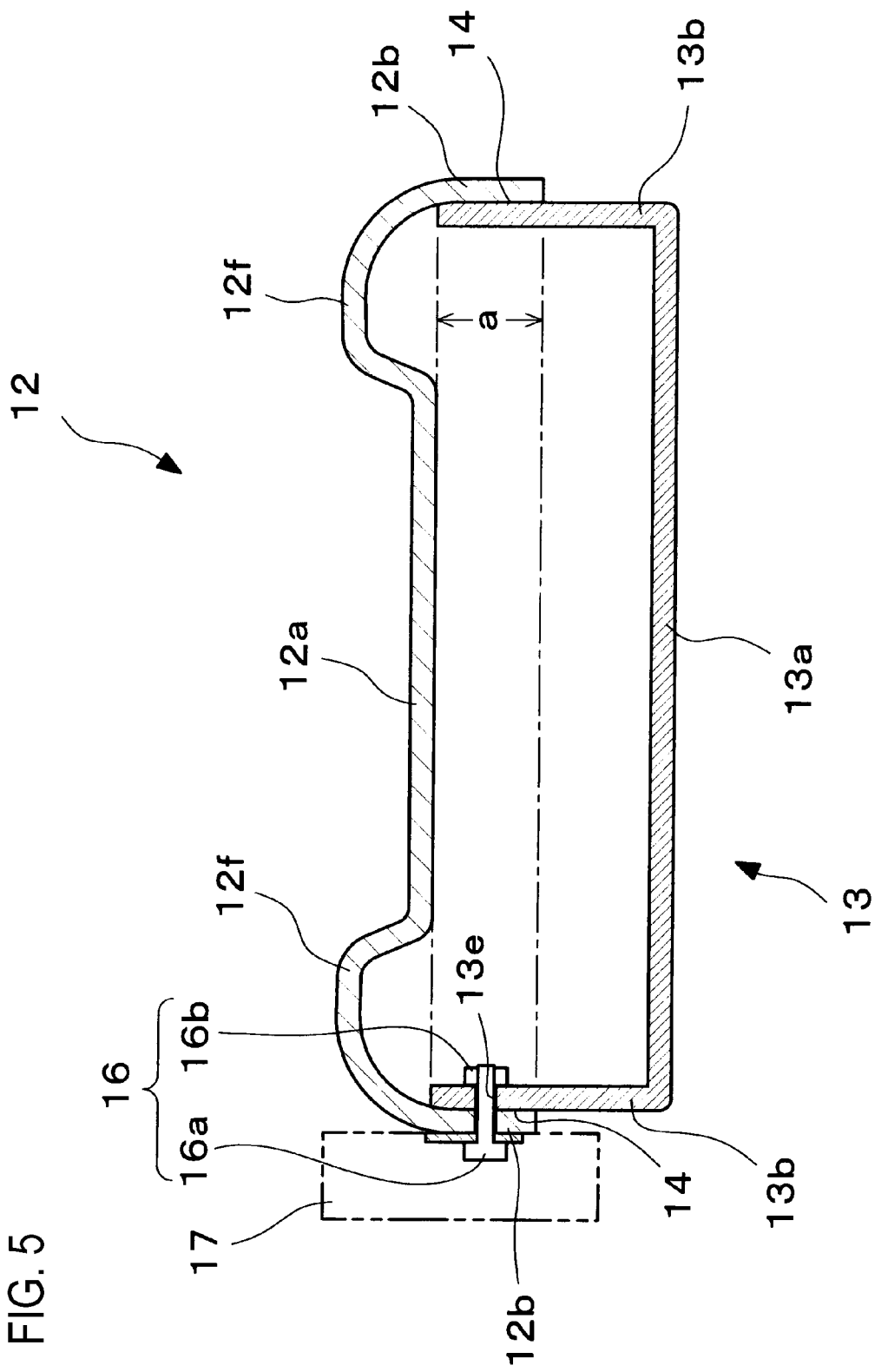
FIG. 5 is a sectional view by the line A-A of FIG. 2.

As in FIG. 5, in the seat back frame 1, the front portion 12a and the rear portion 13a are arranged to be spaced from each other, so that the front side portions 12b and the rear side portions 13b, the front upper portion 12c and the rear upper portion 13c, and the front lower portion 12d and the rear lower portion 13d are respectively partially overlapped with each other, and fixed and jointed on joint surfaces 14 serving as this overlapping portions. Although overlapping states of the front upper portion 12c, the rear upper portion 13c, the front lower portion 12d, and the rear lower portion 13d are not shown, the portions are respectively partially overlapped with each other, fixed, and jointed as well as the front side portions 12b and the rear side portions 13b.

In this case, fixing and jointing includes welding, rivet jointing, the bolt fastening, and spot welding, but it is particularly preferable to use metal inert gas ark welding, laser welding, and the like.

It is preferable that the front frame peripheral portions (the front side portions 12b, the front upper portion 12c, and the front lower portion 12d) are arranged on the outer side of the rear frame peripheral portions (the rear side portions 13b, the rear upper portion 13c, and the rear lower portion 13d), so that the peripheral portions are overlapped with each other. Such a configuration is favorable since a space on the side where the passenger is seated can be widely ensured.

Since the front frame 12 and the rear frame 13 are jointed in such a way, the seat back frame 1 becomes hollow. Since four sides of the substantially rectangular seat back frame 1 are closed, the rigidity against the load is improved at the time of impact in the front and rear direction as well as the left and right direction, so that strength can be improved. The front frame 12 and the rear frame 13 are plate-shaped frames continuous in the seat width (left and right) direction. Thus, the frames have a large deformation resistance particularly against the load from the side (the load in the left and right direction) and have a sufficient strength.

Figure 6:
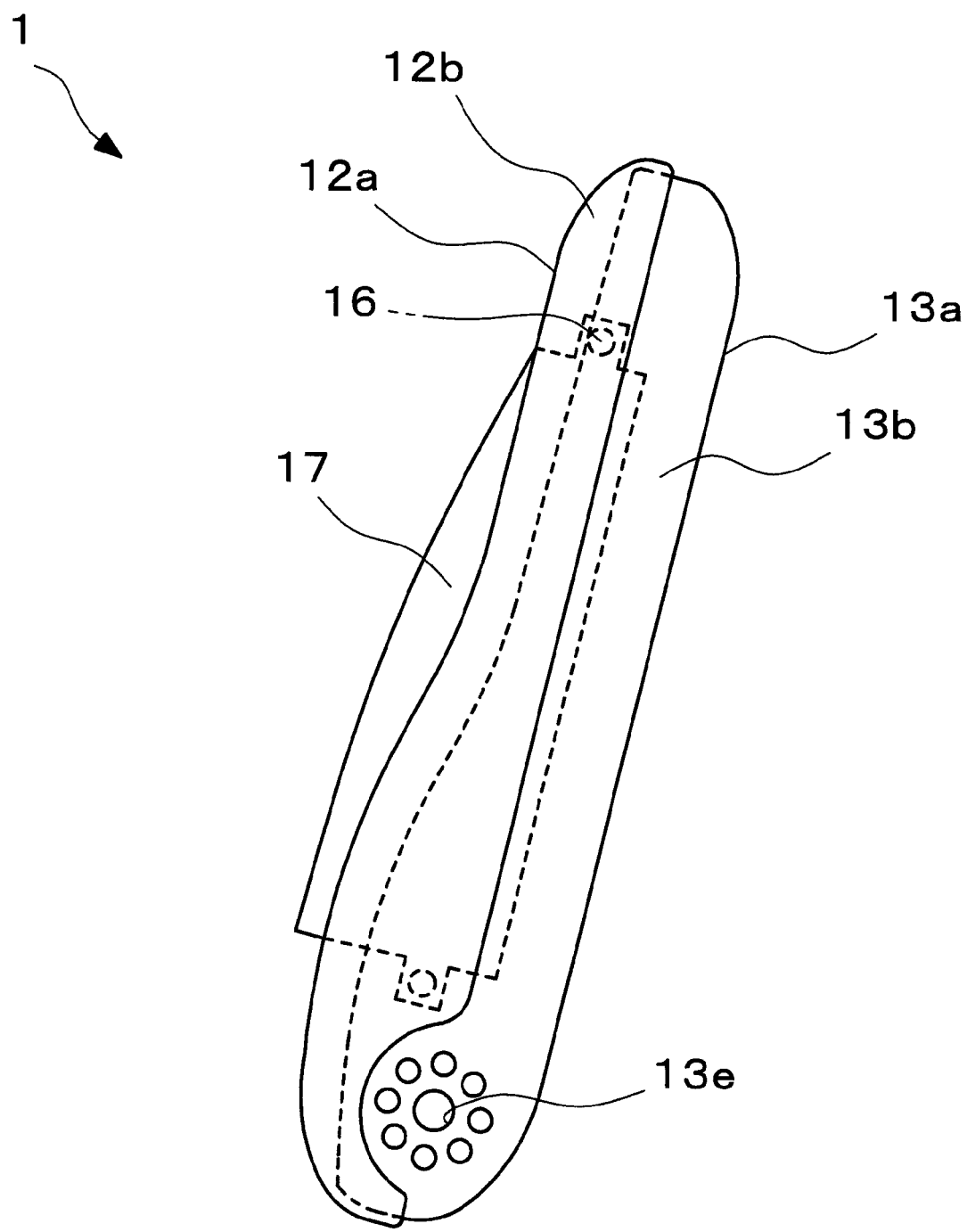
FIG. 6 is a side view of the seat back frame according to the first embodiment of the present invention.

In the seat back frame 1, when a side airbag unit 17 is attached on the side of a vehicle body door on the seat back frame 1 in order to improve safety against side surface impact, the side airbag unit is installed through a plurality of coupling elements 16a, 16b as in FIGS. 5 and 6. At this time, the coupling elements 16a, 16b are engaged with each other via protruding pieces (plate-shaped parts) extending from the side airbag unit 17, the front side portion 12b, and the rear side portion 13b. Specific examples of the coupling elements 16a, 16b include bolts and nuts.

The side airbag unit 17 is jointed on the side of the front frame 12, and coupled by the coupling elements 16a arranged on the side of the side airbag unit 17 and passing through the front side portion 12b and the rear side portion 13b, and the coupling elements 16b arranged on the side of the seat back frame 1. A bracket may be jointed on the projection portion 12f of the front frame 12 and the coupling elements 16b may be provided on the bracket side so that the side airbag unit 17 is attached.

As shown in FIG. 5, the side airbag unit 17 is arranged on the side of the seat back frame 1 and on the front side (the side of the rear frame 13) of a position where the front side portion 12b and the rear side portion 13b are jointed (the joint surface 14). At this time, preferably, the side airbag unit 17 is arranged at a position to be overlapped with the joint surface 14.

With such a configuration, when the side airbag unit 17 is operated, the load due to shock thereof is received by a part of the joint surface 14. Thus, deformation of the seat back frame 1 can be prevented. As a result, a side airbag is effectively operated, so that the safety can be improved.

It is preferable that the side airbag unit 17 is arranged via a plurality of the coupling elements 16 provided in the up and down direction of the seat back frame 1 as in FIG. 6, since attachment strength thereof is improved. Further, a plurality of brackets for arranging the coupling elements may be jointed on the front portion 12a.

Although an example that the side airbag unit 17 is provided on the side of the seat back frame 1 is shown in the first embodiment, an armrest may be attached. For example, in the case where a rotatable armrest is attached, it is favorable that a rotation shaft (an axis) of the armrest is arranged on the front side portion 12b at a position corresponding to the joint surface 14.

The reclining shaft 1a passing through through holes 13e provided on the lower sides of the rear side portions 13b is provided on the lower side of the seat back frame 1. The actuator 11b is connected to the reclining shaft 11a, so that the simply operable reclining mechanism 11 is provided (refer to FIGS. 7A, 7B). The actuator 11b is provided on the side of the vehicle body door, that is, the side where the side airbag unit 17 is arranged in the seat back frame 1. The actuator 11b is attached on the side of the seat back frame 1 using coupling elements 11c, 11d such as bolts and nuts.

Regarding an attachment mode of the reclining mechanism 11, as long as the reclining shaft 11a is attached at positions not to overlap with the joint surfaces 14, the reclining shaft may be inserted into the front side portions 12b. In such a way, since the reclining shaft 11a is inserted at the positions not to overlap with the joint surfaces 14, the reclining mechanism 11 can be provided in a highly flat part of high accuracy. Since there is no need for providing other members for providing the reclining mechanism 11, the number of parts can be reduced.

Since the seat back frame 1 of the present invention is hollow as described above, the reclining shaft 11a passing through the rear side portions 13b does not interfere with members of the seat back frame 1 and does not disturb rotation of the reclining shaft 11a.

Figure 7A:
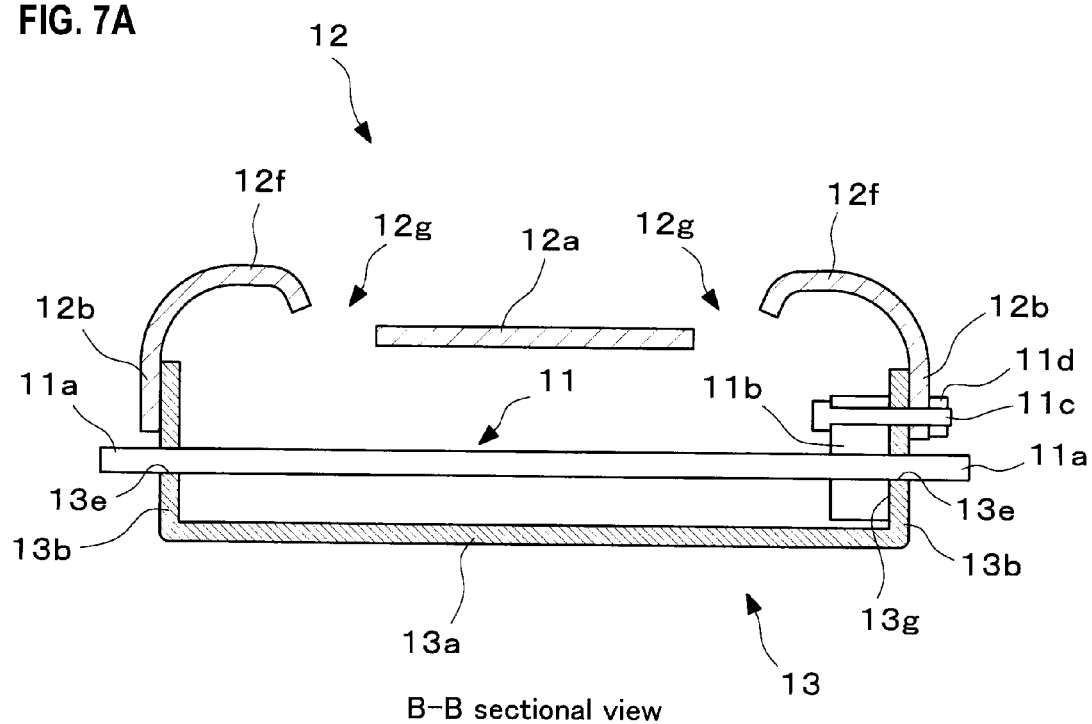
FIG. 7A is a sectional view by the line B-B of FIG. 2.
Figure 7B:
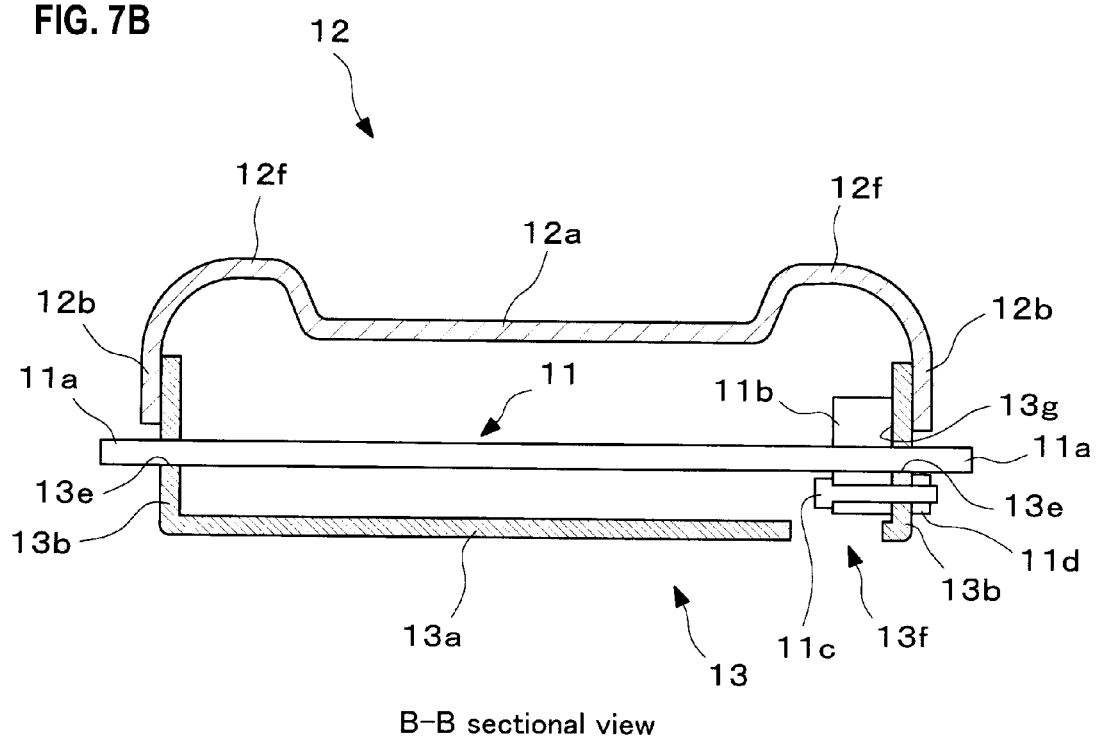
FIG. 7B is a sectional view by the line B-B of FIG. 2.

Although FIG. 7A exemplifies a configuration in which the cutout portions 12g are provided on the sides of the projection portions 12f, a cutout portion 13f may be provided in the rear portion 13a of the rear frame 13 as in FIG. 7B. In this case, it is preferable that the cutout portion 12g or the cutout portion 13f is provided at the position facing the actuator 11b, since the actuator 11b is easily attached. Since the rigidity of the frames is lowered by providing the cutouts, it is enough to provide the cutout portions in one of the front frame 12 and the rear frame 13.

In the present embodiment, the seat back frame 1 is formed by adhering the front frame 12 and the rear frame 13 as described above. Also, the seat cushion frame 2 may be formed by adhering plate-shaped frames.

In the seat cushion frame 2, as in FIGS. 8A, 8B, an upper frame 31 is arranged on the side where the passenger is seated, the upper frame serving as a first frame, and a lower frame 32 arranged to face the upper frame, the lower frame serving as a second frame are formed so that peripheral portions of one of or both of the frames are bent, and ends of the frames are jointed.

In this case, the ends of the frames may be overlapped with each other and jointed on the sides of the frames as in the seat back frame 1. Also, as in FIG. 8A, it is favorable that the lower frame 32 is formed into a flat plate, and the upper frame 31 is bent toward the lower frame 32, so that a joint surface 34 on which the upper frame 31 and the lower frame 32 are jointed is formed on the opposite side of the side where the passenger is seated, since a joint part is not abutted with leg parts of the passenger.

It is favorable that ends of the upper frame 31 and the lower frame 32 are bent and jointed by abutment on a joint surface 33 as in FIG. 8B, since there is no uncomfortable feeling even at the time of abutment with the leg parts of the passenger.

A cutup portion 35 formed by shearing and bending a part of the lower frame 32 is provided in FIGS. 8A and 8B. A trim cord 36 jointed to the skin material 2b by sewing or the like is provided in an end of the skin material 2b. By engaging the trim cord 36 and the lancing portion 35, the skin material 2b is attached to the seat cushion frame 2.

Second Embodiment

Hereinafter, a configuration of the seat back frame 1 of the second embodiment will be described in detail using FIG. 9.

The seat back frame 1 according to the second embodiment is different from the first embodiment in which the first recess portion 12e of the front frame 12 is provided only in a part corresponding to the back of the passenger, and has a characteristic that a second recess portion 12h is also provided in a part corresponding to the lumbar part. In the present embodiment, in addition to the first recess portion 12e, the second recess portion 12h may be provided to be spaced from and on the lower side of the first recess portion 12e. Since configurations other than a configuration relating to the second recess portion 12h and operation are similar to that of the seat back frame 1 of the first embodiment, description thereof will be omitted.

As shown in FIG. 9, two recess portions are provided in the up and down direction in the seat back frame 1 of the second embodiment. By providing the second recess portion 12h in the part corresponding to the lumbar part of the passenger, it accommodates the depression of the lumbar part of the passenger. The second recess portion 12h is provided with a second recess portion side wall 12k in a periphery thereof, and formed continuously and integrally with the front portion 12a to be spaced from the first recess portion 12e. The second recess portion 12h is formed at a position between the two projection portions 12f provided in the front portion 12a.

In such a way, the recess portion is not provided over the entire surface of the front portion 12a of the front frame 12 but the two recess portions (the first recess portion 12e and the second recess portion 12h) are arranged in the up and down direction. With such a configuration, an area of a surface continuous in the seat width (left and right) direction is increased between the first recess portion 12e and the second recess portion 12h. Thus, a high strength against force in the seat width (left and right) direction is obtained, and the load at the time of the impact can be received by the first recess portion side wall 12j and the second recess portion side wall 12k. Therefore, the safety of the passenger is easily ensured especially at the time of the side surface impact. FIG. 9 also illustrates a first coupling surface 12l and a second coupling surface 12m.

Third Embodiment

Hereinafter, a configuration of the seat back frame 1 of the third embodiment will be described in detail using FIG. 10.

The seat back frame 1 according to the third embodiment is different from the first embodiment in which the first recess portion 12e of the front frame 12 is provided with no other members, and has a characteristic that a wire 21 (a coupling member) is arranged in the first recess portion 12e. Regarding a mechanism supporting the pillar, pillar support portions 18b of the third embodiment are different from the first and second embodiments in which the pillar support holes 18a are formed by the cutout portions provided on the upper sides of the front frame 12 and the rear frame 13, and have a characteristic that separate members are fixed, jointed, and installed. Since configurations other than a configuration relating to the first recess portion 12e and the operation are similar to that of the seat back frame 1 of the first embodiment, the description thereof will be omitted.

As shown in FIG. 10, in the seat back frame 1 of the third embodiment, the wire 21 in the seat width (left and right) direction is bridged and arranged in the first recess portion 12e. Both ends of the wire 21 are locked onto axial support portions 22 provided in the first recess portion side wall 12j on the both sides. Although the wire 21 is bridged in the seat width direction in the present embodiment, the wire may be arranged in the height (up and down) direction of the seat.

Since the axial support portions 22 are only required to axially and rotatably support the wire 21, a known technique can be used. The ends of the wire 21 are bent within a range to fit into the first recess portion 12e and retained by the axial support portions 22. The axial support portions 22 are attached within a range to fit into the first recess portion side wall 12j and not to contact the cushion pad 1a mounted on the seat back frame 1.

Instead of the axial support portions 22, holes may be formed in the first recess portion side wall 12j, and the ends of the wire 21 may be rotatably inserted into the holes and retained. The wire 21 is formed by a steel wire material having a spring property, and as shown in FIG. 10, a recess and projection portion 21a serving as a bent portion is formed in the middle of the first recess portion side wall 12j on the both sides.

In such a way, by bridging the wire 21 in the first recess portion 12e, a back surface of the cushion pad 1a is easily supported, so that the cushion pad 1a can be prevented from being weakened. By providing the recess and projection portion 21a, the cushion pad 1a can be supported over a wider area unlike the case where the wire 21 is straight.

In the seat back frame 1 of the third embodiment, the pillar support portions 18b for installing the headrest S3 are arranged on the upper side of the front frame 12 (further in detail, on the upper side of the first recess portion 12e). In the third embodiment, the pillar support portions 18b are formed by fixing and jointing hollow square-pillar (or cylindrical) members to a third recess portion 12i in a state that at least upper parts thereof are opened. The third recess portion 12i is formed on the upper side of the first recess portion 12e by cutting out the front upper portion 12c.

By forming the pillar support portions 18b with such a configuration, even in the case where the first recess portion 12e is largely formed on the upper side and formed up to the vicinity of the front upper portion 12c, the length can be appropriately adjusted so that the headrest pillar 19 is insertable. Therefore, the headrest pillar 19 is firmly attached to the seat back frame 1, so that a sufficient strength can be given at the time of attaching the headrest S3. FIG. 10 also illustrates a first coupling surface 12l and a second coupling surface 12m.

In such a way, since the seat back frame of the present invention is formed so that the pillar support portions are fixed and jointed, general headrest pillar support portions can be attached thereto.

Fourth Embodiment

Hereinafter, a configuration of the seat back frame 1 of the fourth embodiment will be described using FIG. 11.

The seat back frame 1 according to the fourth embodiment has a characteristic that, among the two recess portions on the upper and lower sides provided in the front frame 12 of the second embodiment, the wire 21 is arranged in the first recess portion 12e corresponding to a back of the passenger. Since the configuration relating to the first recess portion 12e, a configuration relating to the wire 21, and the operation are similar to those of the second embodiment and the third embodiment, the description thereof will be omitted.

In the fourth embodiment, although the pillar support portions 18b are shown in the figure regarding attachment of the headrest pillar 19, the pillar support holes 18a formed by cutting out part of the front frame 12 and the rear frame 13 may be provided as well as the first embodiment and the second embodiment.

In addition to the first to fourth embodiments, in the seat back frame 1, the first recess portion 12e and the second recess portion 12h may not be formed continuously to the front portion 12a but formed as through-hole opening portions, and opening portions having the same shape and the same size may also be formed in the rear portion 13a. That is, the first recess portion 12e and the second recess portion 12h may be cut off to serve as the opening portions, and the first recess portion side wall 12j and the second recess portion side wall 12k may not be cut off but untouched, or the first recess portion side wall 12j and the second recess portion side wall 12k may be cut off. With such a configuration, parts of metal plates corresponding to the first recess portion 12e and the second recess portion 12h are cut off in the front portion 12a and the rear portion 13a. Thus, the seat back frame can have a lighter weight.

Nevertheless, in this case, the strength of the seat back frame 1 is lowered in comparison to the case where the entire surface of the front portion 12a is formed by a continuous plate material, that is, unlike in the first to fourth embodiments, the case where the parts of the first recess portion 12e and the second recess portion 12h are not cut off and no opening portions are provided. However, in the case where only the part corresponding to the first recess portion 12e is formed as the opening portion, the loads in the front and rear direction as well as the left and right direction can be received by the part corresponding to the lumbar part of the passenger. Further, when a plate material is arranged in the part corresponding to the lumbar part of the passenger, the depression of the lumbar part is prevented. Thus, an influence on the cervical part can be eased even at the time of the rear surface impact as described above.

Even in the case where the parts corresponding to the first recess portion 12e and the second recess portion 12h are formed as the opening portions, the plate material is placed between the first recess portion 12e and the second recess portion 12h. Thus, in comparison to the case where the opening portions are formed over the substantially entire surfaces of the front portion 12a and the rear portion 13a, a sufficient strength against the loads in the front and rear direction as well as the left and right direction is provided.

Although the first to fourth embodiments exemplify a configuration that the first recess portion 12e and the second recess portion 12h are provided in the front portion 12a, these recess portions may not be formed in the front portion 12a but beads are formed instead. In this case, preferably, a range within which the beads are formed is on the front portion 12a, a range in which the joint surfaces 14 are formed, that is, a range shown by the character "a" in FIG. 5.

Regarding a bead formation range in the front portion 12a, the beads are not necessarily provided in the range shown by the character "a" in FIG. 5. However, when the beads are provided within this range, the strength against load at the time of imposing the load from the side can be improved.

In such a way, the seat back frame 1 is formed by the front frame 12 and the rear frame 13 which are the plate-shaped frames continuous in the seat width (left and right) direction. In a conventional seat back frame, pipe members are arranged on the upper side and the lower side of side frames, and a pressure receiving member for receiving the load of the passenger and the like are arranged between the pipe members. Therefore, unlike the conventional seat back frame having a large number of joint points of the members, the seat back frame 1 described above is substantially integrally formed. Thus, the seat back frame has the rigidity against the load at the time of the impact, and even in the case where an excessive load due to the impact is applied, a seating space of the passenger can be ensured without the deformation and further the load thereof can be transmitted to a vehicle body.

In the seat back frame 1, the four sides of the front frame 12 and the rear frame 13 formed by the rectangular plate materials are closed. Thus, the strength in the seat width (left and right) direction and the front and rear direction is high due to the structure. Therefore, the deformation resistance against stress imposed at the time of the impact is large, so that the deformation of the seat frame F can be prevented. In such a way, since the rigidity is improved due to the structure, members conventionally added to improve the rigidity are omitted and the seat back frame 1 can have a light weight.

Further, the seat back frame 1 has a simple configuration that the seat back frame is formed by combining the plate-shaped front frame 12 and the plate-shaped rear frame 13. The seat cushion frame 2 is formed by combining the upper frame 31 and the lower frame 32. Therefore, unlike a conventional seat frame, there is no need for constituent elements such as side frames and the number of parts can be suppressed. Thus, the inexpensive seat back frame 1 having a high productivity can be provided.

In the seat back frame 1 of the present invention, the front frame 12 and the rear frame 13 are fixed and jointed on the surfaces other than a seating surface of the passenger. In the seat cushion frame 2, the upper frame 31 and the lower frame 32 are jointed at the position away from the surface abutted with the leg parts of the passenger. With this configuration, at the time of receiving the load from the passenger, the load from the passenger is not directly transmitted to the joint parts of the seat back frame 1 and the joint part of the seat cushion frame 2. Thus, the mounted cushion pads 1a, 2a are not easily damaged.

Although the seat back S1 of a front seat of a motor vehicle is described in the above embodiments as a specific example, the present invention is not limited to this. The same configuration can also be applied to a seat back of a rear seat as a matter of course.

All references, including publications, patent applications, and patents, cited herein are hereby incorporated by reference to the same extent as if each reference were individually and specifically indicated as incorporated by reference and were set forth in its entirety herein.

For the purposes of promoting an understanding of the principles of the invention, reference has been made to the preferred embodiments illustrated in the drawings, and specific language has been used to describe these embodiments. However, no limitation of the scope of the invention is intended by this specific language, and the invention should be construed to encompass all embodiments that would normally occur to one of ordinary skill in the art.

The present invention may be described in terms of functional block components and various processing steps. Such functional blocks may be realized by any number of components that perform the specified functions.

The particular implementations shown and described herein are illustrative examples of the invention and are not intended to otherwise limit the scope of the invention in any way. For the sake of brevity, conventional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the steps of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

The words "mechanism" and "element" are used herein generally and are not limited solely to mechanical embodiments. Numerous modifications and adaptations will be readily apparent to those skilled in this art without departing from the spirit and scope of the present invention.

Table of Reference Characters

| | |
|---|---|
| S: | Vehicle seat |
| S1: | Seat back |
| S2: | Seating portion |
| S3: | Headrest |
| F: | Seat frame |
| 1: | Seat back frame |
| 2: | Seat cushion frame |
| 1a, 2a, 3a: | Cushion pad (cushion material) |
| 1b, 2b, 3b: | Skin material |
| 11: | Reclining mechanism |
| 11a: | Reclining shaft |
| 11b: | Actuator |
| 11c, 11d: | Coupling elements |
| 12: | Front frame (first frame) |
| 12a: | Front portion |
| 12b: | Front side portion (front frame peripheral portion) |
| 12c: | Front upper portion (front frame peripheral portion) |
| 12d: | Front lower portion (front frame peripheral portion) |
| 12e: | First recess portion (recess portion) |
| 12f: | Projection portion |
| 12g: | Cutout portion |

-continued

Table of Reference Characters

| | |
|---|---|
| 12h: | Second recess portion (recess portion) |
| 12i: | Third recess portion |
| 12j: | First recess portion side wall |
| 12k: | Second recess portion side wall |
| 12l: | First coupling surface |
| 12m: | Second coupling surface |
| 13: | Rear frame (second frame) |
| 13a: | Rear portion |
| 13b: | Rear side portion (rear frame peripheral portion) |
| 13c: | Rear upper portion (rear frame peripheral portion) |
| 13d: | Rear lower portion (rear frame peripheral portion) |
| 13e: | Through hole |
| 13f: | Cutout portion |
| 13g: | Reclining device attachment portion (device attachment portion) |
| 14, 33, 34: | Joint surface (overlapping portion) |
| 16, 16a, 16b: | Coupling elements |
| 17: | Side airbag unit |
| 18a: | Pillar support hole |
| 18b: | Pillar support portion |
| 19: | Headrest pillar |
| 21: | Wire (coupling member) |
| 21a: | Recess and projection portion |
| 22: | Axial support portion |
| 31: | Upper frame (first frame) |
| 32: | Lower frame (second frame) |
| 35: | Cutup portion |
| 36: | Trim cord |
| 41: | Console box |

What is claimed is:

1. A vehicle seat, comprising:
   a seat frame, comprising a seat back frame and a seat cushion frame;
   cushion material mounted on the seat frame; and
   skin material covering the cushion material;
   wherein:
   the seat back frame comprises a front frame that receives a load of a passenger and a rear frame spaced from the front frame to face the front frame;
   the front frame has a front portion for supporting a passenger's body, and a front frame peripheral portion extending from a periphery of the front portion toward the rear frame;
   the rear frame has a rear portion arranged at a position to face the front portion, and a rear frame peripheral portion extending from a periphery of the rear portion toward the front frame;
   the front portion and the rear portion are spaced from each other to face each other;
   both of right and left sides of the front portion comprise projection portions that are formed to expand toward the passenger;
   the front frame peripheral portion and the rear frame peripheral portion are partially overlapped with each other, fixed, and jointed at outside faces on lateral sides of the projection portions;
   the seat frame is provided with a reclining device attachment portion for attaching a reclining device to the seat frame; and
   at least one of the projection portions is provided with a through-hole at a position opposite to the reclining device attachment portion in an inner side face of the at least one of the projection portions.

2. The vehicle seat according to claim 1, wherein:
   at least one of a recess portion and an opening portion is formed at a position corresponding to a back of the passenger in the front portion, and the at least one of a recess portion and an opening portion is formed with a first coupling surface extending generally symmetrically from a center part to each lateral end of the front portion in a right-to-left direction of the seat; and the first coupling surface is a surface that is folded and extending in a front-to-rear direction.

3. The vehicle seat according to claim 1, wherein:

a reclining device attachment portion is integrally formed on the lower side of a side part of at least one of the front frame peripheral portion and the rear frame peripheral portion.

4. The vehicle seat according to claim 1, wherein:

a coupling element is jointed on one of the left and right sides of the front frame, and the coupling element is coupled to a side airbag unit.

5. The vehicle seat according to claim 1, further comprising:

a headrest arranged on the upper side of the seat back frame; and a pillar support hole supporting a headrest pillar formed by cutting out a part corresponding to a position where a headrest pillar supporting the headrest is arranged at at least at one of the front frame peripheral portion and the rear frame peripheral portion, wherein:

the front frame peripheral portion and the rear frame peripheral portion are arranged to be partially overlapped with each other on both of right and left sides of the pillar support hole.

6. The vehicle seat according to claim 1, wherein:

the front frame peripheral portion is arranged on the outer side of the rear frame peripheral portion to overlap with the rear frame peripheral portion.

7. The vehicle seat according to claim 1, further comprising:

a reclining shaft for a reclining device;

wherein:

the reclining shaft penetrates only the rear frame peripheral portion at a rear of a joint portion of the front frame peripheral portion and the rear frame peripheral portion.

8. The vehicle seat according to claim 2, wherein:

a spring member is mounted to a wall extending in a front-to-rear direction formed in the at least one of a recess portion and an opening portion.

9. The vehicle seat according to claim 2, wherein:

the front portion comprises a second coupling surface formed at least at a top portion of the projection portions and extending in a lateral direction to couple both lateral ends of the front portion.

10. The vehicle seat according to claim 1, wherein:

another auxiliary part is fixed to the rear frame peripheral portion in an overlapped manner in a lateral direction.

11. The vehicle seat according to claim 1, wherein:

another auxiliary part is fixed to the rear frame peripheral portion in an overlapped manner in a lateral direction in front of a reclining shaft for a reclining device.

\* \* \* \* \*